United States Patent [19]

Santerre

[11] 4,204,697
[45] May 27, 1980

[54] VARIABLE WHEELBASE ROAD TRUCK

[76] Inventor: David Santerre, 13 Brunet St., Pointe-des-Cascades, Canada

[21] Appl. No.: 955,388

[22] Filed: Oct. 27, 1978

[51] Int. Cl.² ............................................. B62D 33/08
[52] U.S. Cl. ................................ 280/80 B; 180/24.02
[58] Field of Search .................. 280/80 B, 81 R, 638, 280/656; 180/24.02

[56] References Cited

U.S. PATENT DOCUMENTS

| | | | |
|---|---|---|---|
| 3,838,885 | 10/1974 | Brennan | 280/81 R |
| 3,895,818 | 7/1975 | Fearon | 280/81 R |

*Primary Examiner*—John J. Love
*Assistant Examiner*—John A. Carroll

[57] ABSTRACT

A dump truck or other truck having a rigid chassis and a front and a rear axle assemblies secured at fixed points along the chassis, wherein this truck is distinctively provided with a supplementary axle assembly displaceable behind the conventional rear axle assembly lengthwise of the truck chassis, between a position protracting rearward from the latter to increase the payload rating of the truck and a retracted position under the rear of the chassis for unhindered dumping operation. The supplementary axle assembly is also vertically adjustable between an off-the-ground position for the empty return trips, a normal suspension position for the increased payload rating, and a stiffer suspension position for increased loading on the front axle and steering maneuverability. This truck includes a supplementary frame slidably connected to the chassis, and hydraulic cylinder slidably actuating this frame, and an adjustable suspension interposed between the supplementary axle assembly and frame for the afore-mentioned vertical adjustment.

2 Claims, 4 Drawing Figures

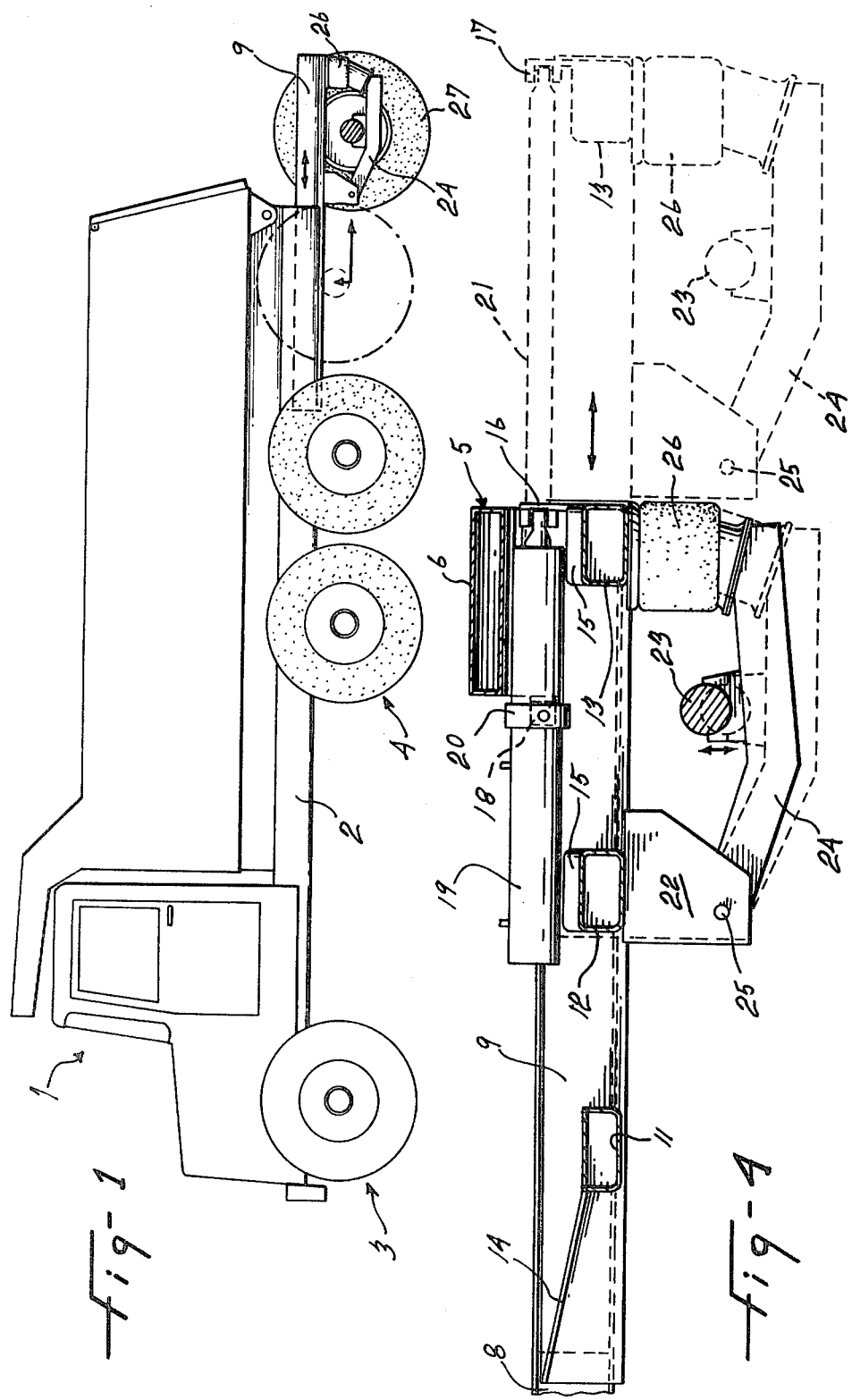

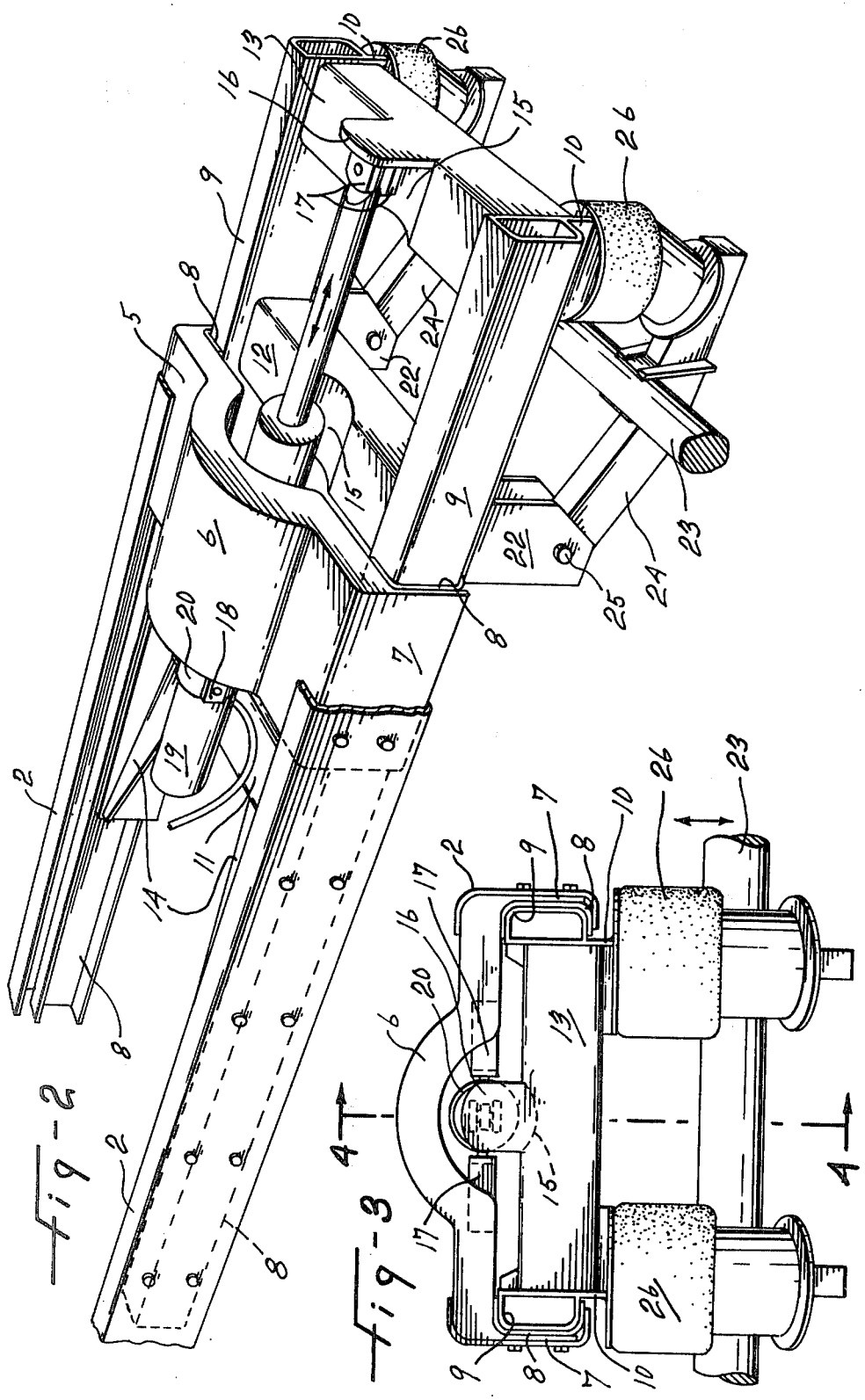

VARIABLE WHEELBASE ROAD TRUCK

This invention relates to road trucks and, more particularly, to a road truck of the type including a single rigid chassis and a front and a rear axle assemblies at fixed points along the same chassis.

Such trucks are very common and cover a large range of payload ratings. The local traffic laws and regulations are such that a truck of this type may not now exceed a statutory maximum payload rating. The local traffic laws and regulations also specify that, if a truck is provided with a supplementary rear axle at least a few feet from another rear axle, a substantially higher payload rating is reached and, consequently, such truck may carry a worthwhile additional payload.

It is a general object of the present invention to provide a road truck of the above type which is adapted to take advantage of the above-mentioned traffic laws and regulations to legally carry a worthwhile additional payload.

It is another general object of the present invention to provide a road truck of the above type with a supplementary axle assembly particularly adapted for addition to a dump truck without hindering the normal dumping operation thereof.

It is a further object of the present invention to provide a road truck of the above type with a supplementary axle assembly which allows to vary the loading on the front axle relative to the loading on the conventional rear axle and which thus allows to improve the steering when desired.

It is still another object of the present invention to provide a dump truck with a supplementary axle assembly arranged to substantially increase the maximum payload rating thereof but wherein this supplementary axle assembly is extendible rearward of the chassis of the truck to a higher payload rating position, is retractable lengthwise under the rear of the chassis, allowing unhindered truck dumping and is upwardly adjustable between an off-the-ground inoperative position for empty return of the truck, a normal suspension position for additional payload rating, and a stiffer suspension position for increased loading on the front axle and increased steering maneuverability.

The above and other objects and advantages of the present invention will be better understood with the following detailed description of a preferred embodiment thereof which is illustrated, by way of example, in the accompanying drawings, in which:

FIG. 1 is a side elevation view of a dump truck provided with a supplementary axle assembly according to the present invention;

FIG. 2, on the other sheet of the drawing, is a perspective view of the rear portion of the dump truck chassis and the supplementary frame of the truck of FIG. 1;

FIG. 3 is a rear elevation view of the truck chassis and supplementary frame as seen from the right in FIG. 2; and FIG. 4, on the same sheet as FIG. 1, is a cross-section view longitudinally of the truck, as seen along line 4—4 in FIG. 3.

The illustrated dump truck 1 includes a conventional elongated chassis comprising a pair of longitudinal beams 2 in the form of channel members. This truck chassis is of any convention construction and, therefore, the exact mode of interconnection of the beams 2 need not be defined. A front axle assembly 3 and a tandem axle assembly 4 are fixed at predetermined joints along the length of the chassis and of the beams 2. A hollow cross beam 5 extends transversely between the rear end portions of longitudinal beams 2 and replaces the conventional straight cross beam found at the rear end of a conventional truck chassis. Cross beam 5 is formed with an upwardly convex central portion 6 and with the opposite ends forming parallel mounting flanges 7 in engagement against the inner side of the channel-shape beams 2. A pair of inwardly opening channel-shape guides, or slides 8, are fixed against the inner side of the mounting flanges 7 and to the longitudinal beams 2 respectively. Slides 8 extend within beams 2 and are secured to the same by bolts or the like.

A supplementary frame is slidably mounted in the C-shape guides or slides 8, as will be hereinafter defined in detail. The supplementary frame includes a pair of tubular beams 9, each having a downward flange 10. The tubular beams 9 are slidably engaged in the guides or slides 8 with the flanges 10 projecting lower than the bottom flange of the longitudinal beams 9. Stiffening plates 14 are secured to the beams 9 and to the opposite ends respectively of the crossbar 11. Each of the two crossbars 12 and 13 is provided with a concave central portion 15. The rearmost crossbar 13 is formed with a tongue 16 in alignment with the concave portions 15. A pair of lugs 17 are secured against the front face of the tongue 16. A pair of L-shape brackets 18 are secured against the front side of the cross beam 5 with one end portion projecting forwardly in spaced-apart relationship with the corresponding one end portion of the other bracket 18. A double-acting hydraulic cylinder and piston unit is provided to slide the supplementary frame in slides 8. This hydraulic unit includes a cylinder casing 19 engaged in a collar 20 pivoted to the brackets 18 about a transverse pivot axis. The hydraulic cylinder also includes a plunger or piston rod 21 pinned to the lugs 17. Thus, the hydraulic cylinder extends longitudinally of the truck in the spaces defined by the upwardly convex curvature of the hollow beam 5 and by the concave portions 15 of the crossbars 12 and 13.

A pair of brackets 22 are rigidly fixed under the beams 9 and cross bar 12 and project downwardly therefrom. A selectively adjustable suspension is connected to the afore-described supplementary frame to support the supplementary axle 23. This selectively adjustable suspension includes a pair of laterally spaced-apart arms 24 extending lengthwise longitudinally of the truck and pivoted at their front end to the brackets 22 respectively by transverse pins 25. An adjustable pressure air suspension bag 26 is connected between the rear end of each arm 24 and the corresponding downward flange 10 and extend underneath rearmost cross bar 13. The air suspension bags 26 are of any appropriate and known construction.

The supplementary axle 23 extends transversely of the chassis, is fixed to the intermediate portion of the arms 24 and carries a pair of wheels 27. For the sake of clarity, the supplementary axle assembly is merely represented by the axle 23 and the wheels 27. However, it is contemplated to preferably use a self-steering axle, not shown, but of known construction.

As may be seen from FIGS. 1 and 4, the extension of the hydraulic cylinder produces protraction of the supplementary frame and of the supplementary axle assembly to a protracting position in cantilever relation with the rear of the chassis. It must be noted that the supplementary frame is strictly non-pivotally slidable such as to define the rigid cantilever relation with the chassis. The air suspension bags 26 may be normally pressurized for normal suspension, in which case an additional payload is allowed. The pressure in the bags 26 may be increased to increase the loading on the front axle assembly and thus also increase the steering maneuverability of the truck.

The hydraulic cylinder may also produce full retraction of the supplementary frame and the supplementary axle assembly under the chassis, as shown in dashed lines in FIG. 1, and in full lines in FIG. 4. In this retracted position, the supplementary axle assembly does not exceed the rear of the chassis and, thus, allows unhindered normal dumping operation. The air suspension bags 26 are then preferably depressurized to allow elevation of the supplementary axle assembly to an off-the-ground position, as shown in dashed lines in FIG. 1. This of-the-ground position is used for the empty return trips of the truck. The arrows in FIGS. 1, 2, and 4 illustrate these two longitudinal and vertical displacements of the supplementary axle assembly.

In the retracted position of the supplementary frame and supplementary axle assembly, the wheels of the latter clear the wheels of assembly 4, as shown in FIG. 1, since assembly 4 is mounted under the truck chassis sufficiently forwardly of the rear ends of beams 2 for that purpose.

The system of the invention allows the positioning of the beams 30 of a conventional truck dumping box assembly directly on the chassis beams 2, as shown in FIG. 1, with the box 31 capable of dumping action about pivot 32 when the supplementary frame is in retracted position.

What I claim is:

1. A variable wheelbase truck comprising an elongated, rigid chassis including a pair of spaced parallel channel-shaped longitudinal beams, each having a front end and a rear end, cross beams rigidly interconnecting said longitudinal beams, one of said cross beams, being the rearmost cross beams, rigidly interconnecting the rear ends of said longitudinal beams and including a central upwardly convex portion defining a central recess at its underside, elongated slide members secured within and extending longitudinally of said longitudinal beams and terminating at the rear end of the latter, a movable frame including a pair of spaced-apart longitudinal beams slidably fitted within the respective slide members for slidable movement within and longitudinally of said slide members, cross bars rigidly interconnecting said last-named longitudinal beams at longitudinally spaced zones of the latter and including a rearmost cross bar rigidly interconnecting the rear ends of said last-named longitudinal beams, and a second cross bar next to said rearmost cross bar and spaced forwardly thereof along said movable frame, a tongue upstanding from the central portion of said rearmost cross bar and rigid therewith, a double-acting cylinder and piston unit extending longitudinally of said chassis and frame along the center line thereof and with the cylinder of said unit pivotally attached to one of said cross beams and extending across said recess and underneath said rearmost cross beam, and with the rear end of the piston rod of said unit extending above the level of the rearmost cross bar and pivotally attached to said tongue, a bracket rigidly fixed under each longitudinal beams of said movable frame and under said second cross bar, a lever arm extending longitudinally of the truck, pivoted to said bracket at its front end, an adjustable pressure air suspension bag extending between and connected to the rear end of said lever arm and to the underside of the rear ends of the longitudinal beams of said movable frame and underneath said rearmost cross bar, a rear wheel and axle assembly secured at a fixed position to and underneath the longitudinal beams of said chassis and spaced forwardly from the rear ends of said longitudinal beams of said chassis, a supplementary wheel and axle assembly secured to said lever arms intermediate the ends thereof, said movable frame, upon action of said cylinder and piston unit, moving between an extended position in which said brackets and said supplementary wheel and axle assembly are located rearwardly of said rearmost cross beam, and a retracted position in which said rearmost cross bar lies directly underneath said rearmost cross beam and said movable frame, rearmost cross bar, air suspension bags and supplementary wheel and axle assembly do not protrude rearwardly of the rearmost cross beam and of the rear ends of the longitudinal beams of said chassis, the wheels of said rear wheel and axle assembly being disposed sufficiently forwardly of the rearmost cross beam to clear the wheels of the supplementary wheel and axle assembly in the retracted position of said movable frame.

2. A variable wheel base truck as claimed in claim 1, further including a downwardly extending flange secured to, and depending from, the longitudinal beams of said movable frame and to the lower edge of which said bracket and said air suspension bags are connected, said flange clearing the lower edges of said channel-shape longitudinal beams of said chassis.

* * * * *